United States Patent Office 2,999,833
Patented Sept. 12, 1961

2,999,833
PROCESS FOR MIXING A NOVALAK RESIN AND SAND WITH AN A-STAGE RESIN AND SAND TO OBTAIN A SHELL MOLDING SAND
Julius M. Bleuenstein, Detroit, Mich., assignor to Ford Motor Company, Dearborn, Mich., a corporation of Delaware
No Drawing. Filed Apr. 9, 1954, Ser. No. 422,259
1 Claim. (Cl. 260—38)

This invention is concerned with the founding industry and is more particularly related to a process for the manufacture of a shell molding sand and the resultant sand so produced.

In shell molding as currently practiced, the usual procedure is to mix with ordinary founding sand about 5 percent or more of a solid phenolic aldehyde type resin, said resin having been cured sufficiently prior to admixture with the sand to give a melting point sufficiently high to prevent sand resin mixture from falling away from or peeling off of the vertical surfaces of a heated pattern.

This procedure has been plagued by two serious disadvantages; namely, the high cost of the resin and the dustiness of the sand resin mixture which has presented a serious health hazard to operating personnel. This invention has been developed in an effort to use less of a cheaper resin and to produce a dry free-flowing, but dust-free sand.

This invention is predicated upon the stability of the Novalak type resin (phenol rich resin) to heat in the absence of a catalyst such as hexamethylenetetraamine or strong acids. This invention also makes use of the reactivity of phenol poor so called A stage resins in the presence of catalysts. This invention further employs the thermal inertia of the large mass of sand compared to resin to prevent unduly rapid reactions among the various resins.

This invention is probably best understood from a consideration of the following procedures which have been found to produce an excellent sand for blowing shells in a hot core box. In each cast the base sand was an approximately number 90 Juniata sand.

Example 1

Into a cold muller was added 40 pounds of cold sand, 8/10 of a pound of A stage phenol formaldehyde liquid resin of the type employed in the glass wool industry, 0.16 pound of hexamethylenetetraamine and 25 grams of 28 percent ammonium hydroxide, the ammonium hydroxide serving to stabilize the free formaldehyde present in the formaldehyde rich A stage resin. The mixture is mulled until the sand grains are thoroughly coated with the resin. In a second muller arranged to operate at a temperature of 300° F. is added 40 pounds of sand which has been preheated to 300° F. and 1.6 pounds of phenol formaldehyde Novalak type resin, this resin being a phenol rich water insoluble material. The Novalak resin is mulled into the hot sand for six minutes and hot muller is then discharged into the cold muller containing the mulled mixture of cold sand and A stage resin. The mixed sands are mulled for 10 minutes or until the sand has sufficiently cooled. During this mulling there is added to the sand about 30 grams of magnesium or zinc stearate as a lubricant. This produces a free-flowing dust free sand which will cure in 14 seconds in a quarter inch section in a 400° F. core box.

Example 2

In a cold muller mix together 40 pounds of cold sand, a quantity of A stage resin, 12½ grams of ammonium hydroxide, 0.08 pound of hexamethylenetetraamine and 15 grams of zinc or magnesium stearate. In a hot muller at 300° F. mix together for six minutes 40 pounds of sand preheated to 300° F. and 0.8 pound of Novalak. Combine the hot and cold sand in the cold muller, mull for six minutes and remove a free flowing core blowing sand.

Example 3

Mull together in a cold muller 40 pounds of sand, 0.6 pound of an ammonium chloride catalyzed liquid Novalak having a mole ratio of .7 to 1.0, the ammonium chloride catalyst being added to the extent of 1%0 percent of ammonium chloride based upon phenol, 0.12 pound of hexamethylenetetraamine and 30 grams of magnesium stearate. In a second hot muller at 250–300° F. mull together 40 pounds of 250–300° F. sand and 0.6 pound of solid or liquid Novalak for six minutes, discharge into cold muller and mull until completely mixed.

A study of the above examples will show that in each case a phenol rich Novalak type resin was mulled hot to coat the sand in the absence of any catalysts. In the first two examples, the formaldehyde rich and reactive resin was mulled cold with a catalyst and a quantity of sand and the necessary catalyst thoroughly dissolved in this cold resin so that it is readily available to promote the reaction between the phenol rich Novalak and the formaldehyde rich A stage resin when the hot and cold resin are intermingled.

Example 4

Example 1 may be modified by the elimination of a part, or all of the sand originally added to the cold muller. The quantity of all of the ingredients other than sand are adjusted to maintain the same total sand resin ratio. If all of the sand be omitted from the cold muller, the mulled hot sand Novalak mixture is permitted to cool in the cool muller to at least 250° F. before the A stage resin, hexamethylenetetraamine and ammonium hydroxide are added. The evaporation of water present in the A stage resin and produced by the reaction serves to cool the mix and prevent too violent a reaction. In case the reaction is too violent, or the sand is too hot, recourse may be had to the deliberate addition of water to the hot sand to lower its temperature.

It is to be understood that the excess phenol or excess formaldehyde present respectively in the Novalak or the A stage resin may be present as phenol or formaldehyde or it may be reacted to any desired extent with the other constituent of the resin.

The above described procedures are primarily directed to sands destined to be used in core or mold blowing. If it is desired to manufacture ordinary shell making sands, the total resin content should be raised to 4 to 5 percent and the quantities of Novalak should be raised at the expense of the A type resin to take advantage of the higher melting points inherent in the Novalak resins.

I claim as my invention:

The process of producing a molding sand for shell molding comprising intensively mixing together a Novalak resin and a mass of sand heated sufficiently to cause the Novalak resin to coat the individual sand grains, intensively mixing together a second quantity of sand and an A stage phenol formaldehyde resin containing a polymerization catalyst, said second mixing operation being conducted at a temperature too low to permit substantial polymerization of said A stage phenol formaldehyde resin, combining said two sand batches while the hot mixed sand retains a substantial amount of heat and mixing the combined sands until a free flow, non-dusting sand is obtained.

References Cited in the file of this patent

UNITED STATES PATENTS

| | | |
|---|---|---|
| 1,901,325 | Novotny | Mar. 14, 1933 |
| 2,008,723 | Mills | July 23, 1935 |
| 2,114,229 | Martin et al. | Apr. 12, 1938 |
| 2,168,981 | Flood | Aug. 8, 1939 |
| 2,174,755 | Novotny | Oct. 3, 1939 |
| 2,321,783 | Webber | June 15, 1943 |
| 2,662,067 | Less et al. | Dec. 8, 1953 |
| 2,706,188 | Fitko | Apr. 12, 1955 |